United States Patent [19]

McFarland et al.

[11] Patent Number: 5,507,689
[45] Date of Patent: Apr. 16, 1996

[54] METHOD AND SEPARATOR APPARATUS FOR GAINING REMAINING MEAT FROM BONE STRINGS

[75] Inventors: Archie P. McFarland, Salt Lake City, Utah; Sigurd Richartz, Lübeck, Germany

[73] Assignee: Nordischer Maschinenbau Rud. Baader GmbH & Co. KG, Lubeck, Germany

[21] Appl. No.: 292,966

[22] Filed: Aug. 22, 1994

[30] Foreign Application Priority Data

Aug. 27, 1993 [DE] Germany ............... 43 28 627.5

[51] Int. Cl.⁶ .................................. A22C 17/00
[52] U.S. Cl. ............................................. 452/138
[58] Field of Search ........................... 452/138, 135

[56] References Cited

U.S. PATENT DOCUMENTS 3,396,768  8/1968  Kurihara ..................... 452/138
3,829,931  8/1974  Suerbaum .................... 452/138
4,637,094  1/1987  Matsubayashi ............... 452/138

*Primary Examiner*—Willis Little
*Attorney, Agent, or Firm*—Fay, Sharpe, Beall, Fagan, Minnich & McKee

[57] ABSTRACT

A method for gaining the remaining meat from the bones of cutlet strings or racks and a separating apparatus for carrying out this method are described. The separating apparatus essentially comprises a hollow drum (1) having a perforated outer surface (7), on which a compression belt (2) partially wrapped around said drum (1) is held under pressure. The hollow drum (1) includes a groove (8) in its central region which extends radially and around said drum and comprises perforated limiting faces. The cross-section of the groove (8) essentially corresponds to that of the bone string to be processed.

18 Claims, 1 Drawing Sheet

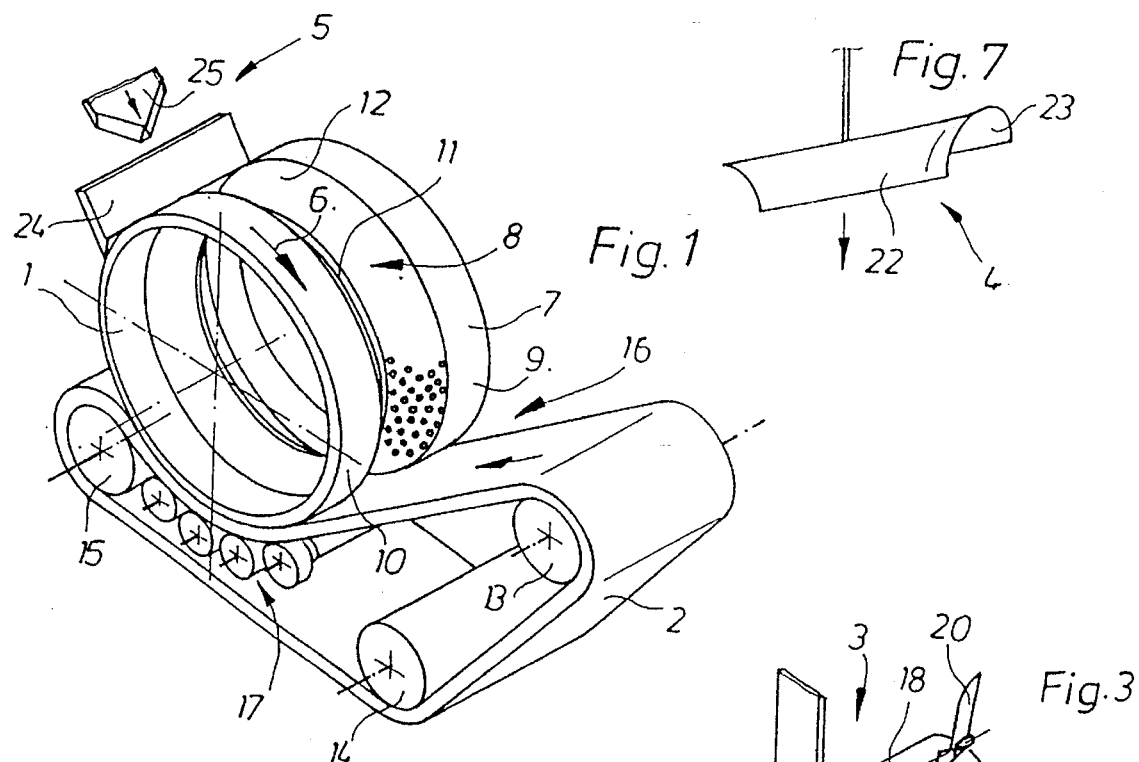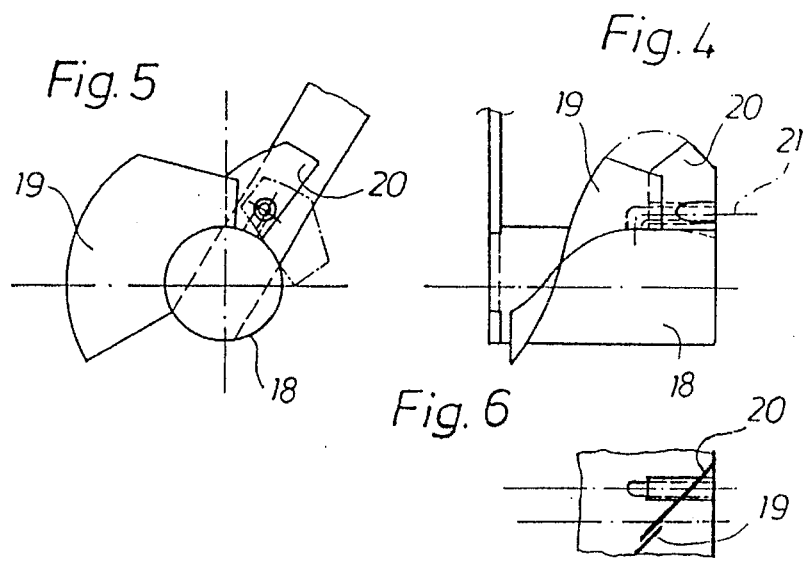

1

METHOD AND SEPARATOR APPARATUS FOR GAINING REMAINING MEAT FROM BONE STRINGS

BACKGROUND OF THE INVENTION

1. Field of the Invention

The invention concerns a method for gaining remaining meat from the bones of cutlet strings or racks of slaughtered warm-blooded animals, in particular of pigs, and a separating apparatus for carrying out the method comprising a rotatably driven hollow drum, open on one side and having a perforated outer surface, an endless elastic compression belt, the outer surface of said compression belt being wrapped around a portion of the circumference of the hollow drum and guided to form a pull-in wedge for the material to be compressed and a compression zone under the effect of compression means, as well as a clearing device in the interior of the hollow drum and a scraping device associated with the outer surface of said hollow drum.

2. Prior Art

The said cutlet strings or racks are obtained during the initial division or carving up of in particular pigs, and include a connected bone string of about 20 dorsal vertebrae of the vertebral column, which has been split in the plane of symmetry of the animal in an earlier process by means of a saw and from which the ribs and the vertebral appendages have been removed leaving only short stumps on respective vertebrae. The cutlet strings or racks also include a meat or flesh string, which, when connected to the bone string, is traded as smoked loin of pork (Kassler) and when boned, serves as the starting product for a variety of special products like sliced smoked ham. The boning of these cutlet strings or racks or the cutting free of meat from the bone string is normally performed manually and produces a bone string to which, particularly in the groove region between the vertebrae and both sides of the rib stumps valuable remaining meat is still attached, but cannot be accessed for reasons of cost.

3. Objects of the Invention

It is thus an object of the invention to provide a method with which such remaining meat can be gained mechanically.

It is a further object of the invention to provide an apparatus capable of carrying out this method.

Another object of the invention is to provide a method and apparatus for mechanically gaining such remaining meat with the resulting meat containing a minimum of bone splinters.

It is a still further object of the invention to provide a method and apparatus for mechanically gaining such remaining meat whereby the resulting meat is of high quality and at least of the standard and quality of known "soft-separator quality".

SUMMARY OF THE INVENTION

In a method for gaining remaining meat from the bones of cutlet strings or racks from slaughtered warm-blooded animals, in particular pigs, these and further objects are achieved according to the invention in that only those parts of the bone string carrying remaining meat are subjected to a quasi-hydraulic pressure which is generated between a perforated supporting surface and an elastic compression element.

The efficiency and productivity achievable with this method can be improved when the bone strings are (fed to and) passed through the compression zone continuously.

This method can be performed according to the invention by means of a separating apparatus comprising a rotatably driven hollow drum, open on one side and having a perforated outer surface, an endless elastic compression belt, the outer surface of said compression belt being wrapped around a portion of the circumference of the hollow drum and guided such that it forms a draw-in wedge for the compression material and a compression zone under the effect of compression means, as well as a clearing device in the interior of the hollow drum and a scraping device associated with the outer surface of said hollow drum, wherein the hollow drum comprises a groove-like channel which interrupts its outer surface and extends radially and around the same, the cross-section of the channel corresponding essentially to the cross-section of the cutlet strings/racks to be processed.

In a preferred embodiment of the invention, the outer surface of the hollow drum may be interspersed with perforations at least in the region of the channel.

With a separating apparatus designed and a method performed in the way described, it is possible while excluding bone splinters to greatest possible extent to gain remaining meat of a quality corresponding to the known "soft-separator" quality, i.e. in the form of a high quality stuffing for sausages or the like.

Such stuffing meat collects in the interior of the hollow drum and must be conveyed from there to the outside. This can be performed by means of a known clearing device in the form of a conveyor worm or feed screw which is adapted to be introduced into the hollow drum through the latter's open side and may preferably be provided with at least one screw shaped web adapted to the contours of the drum interior, but wherein the leading portion of the web can be made to turn against the rotational direction of the drum in an enveloping circle which has a diameter smaller than the interior diameter of the hollow drum.

The advantage of this arrangement lies, in particular, in that the clearing device, on the one side, can operate effectively on the whole surface, i.e. the extracted stuffing/sausage meat is transported out rapidly and carefully and therefore retains its quality and, on the other side, may be easily removed from the hollow drum for the purposes of cleaning.

A condition for the correct operation of the apparatus is that the bone strings to be processed are supplied in a specific position and alignment. In order to safeguard this, a guiding device for supplying the bone strings in the correct alignment with respect to the position of the channel in the outer surface of the hollow drum may be arranged directly upstream of the draw-in wedge.

BRIEF DESCRIPTION OF THE DRAWINGS

Other objects and advantages of the present invention will be apparent from the following description and claims and are illustrated in the accompanying drawings which, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows a simplified perspective overview of the apparatus including a simplified view of the stripping device in a partially exploded representation, FIG. 2 shows a radial section through the hollow drum of FIG. 1, FIG. 3 shows a perspective view of the clearing device, FIG. 4 shows a side view of the clearing device according to FIG. 4, FIG. 5 shows a front view of the clearing device according to FIG. 4, FIG. 6 shows a partial elevation of the end portion of the clearing device according to FIG. 4, and FIG. 7 shows a perspective view of the guiding device.

DETAILED DESCRIPTION OF THE PREFERRED EMBODIMENTS

The basis of the concept modified according to the invention is a separating apparatus which functions according to the principle of cooperation between a hollow drum and a compression belt. In accordance with FIG. 1, this apparatus essentially comprises a hollow drum 1, a compression belt 2, clearing means 3, guiding means 4 and stripping means 5, all located in a frame, which, for reasons of clarity, is not shown.

The hollow drum 1 is open on one side and rotationally driven in the direction indicated by the arrow 6 in an appropriate manner. The drum comprises a cylindrical outer surface 7 which is interrupted by a groove or channel 8 extending radially around the outer surface so that the cylindrical outer surface 7 is divided into two cylindrical end areas 9 and 10. The groove 8 has a somewhat V-shaped or triangular cross-section with the groove base 11 being formed from a narrow cylinder face, i.e. the apex of the V or triangle being flattened. The end areas 9, 10, the groove base 11 and the groove flanks are perforated over their whole extent.

The compression belt 2 is designed to be endless and is driven to rotate synchronously with the hollow drum 1 in an appropriate fashion. It is highly elastic in its thickness dimension and in its length dimension is flexible but largely unelastic and is guided by means of deflection rollers 13, 14, 15 in such a way that its upper surface is wrapped around a part of the hollow drum's 1 circumference. In this way, the compression belt 2 forms a draw-in wedge 16 together with the outer surface 7 of the hollow drum 1. The deflection roller 15 located at the end region of the wrapped belt portion is formed as a compression roller, which is adjustable with respect to its distance from the hollow drum 1. Compression means 17 are arranged between the compression roller 15 and the draw-in wedge 16 and comprise a series of rollers which support the compression belt 2 in addition to the pressure caused by the tension of the compression belt, whereby this support occurs initially only in the edge regions of the compression belt 2 and progressively increases over the whole width of the belt in the direction towards the compression roller 15.

The clearing means 3 comprise a stationary conveyor worm or feed screw 18 with a screw-wound web 19. The conveyor worm 18 is designed to be slidable into the hollow drum 1, whereby, in its operative position, a substantially uniform gap is left between the web 19 and the inner contour of the drum 1. To this end, the front portion 20 of the web 19, i.e. the portion associated with the interior of the drum 1 which lies behind the constriction formed by the groove 8, is mounted to pivot anticlockwise on a steering stub axle 21. The steering stub axle 21 is arranged in such a way that the front portion 20 of the web 19 can pivot inside an enveloping circle of a diameter smaller than the smallest interior diameter of the drum 1.

The guiding means 4 comprises a guide element 22 which forms a tunnel-shaped guide canal 23 with the compression belt in the area upstream of the draw-in wedge 16. The guide canal 23 is aligned with the groove 8 and has a cross-section which essentially corresponds to than of the bone strings to be processed.

The stripping means 5 comprises a first stripping blade 24 extending across the whole length of the drum 1 in contact with the outer surface 7 of the same, which operates effectively only on the end areas 9, 10 of the drum 1, and a second stripping blade 25, which is arranged in front of the first stripping blade 24 in the direction of rotation of the drum 1 and whose effective operation is limited to the region of the groove 8. Both stripping blades 24, 25 are arranged to be adjustable with respect to the drum outer surface 7 and are adjustably spring loaded in their contact positions.

For the operation of the above described separator apparatus in accordance with the present invention, the various components designated 3, 4 and 5 are moved in the directions indicated by the corresponding arrows, hence, the clearing means 3 are inserted into the drum 1, the guiding means 4 are moved to a position at a short distance from the compression belt 2 and the stripping means are moved into their contact position with the outer surface 7 of the drum 1. In order to insert the clearing means 3, the front portion 20 of the web 19 of the conveyor worm 18 is swung down into the position indicated in FIG. 5 by a broken line and after insertion it is erected manually. The bone string to be processed is then inserted into the guiding tunnel of the guiding means 4, whereby the placing of the bone string on the compression belt 2 occurs such that the cut edges or faces resulting from the longitudinal division of the animal carcass face the compression belt 2. Due to the effect of the guide means 4, an alignment occurs such that the rib stumps protrude into the groove 8 and the parts carrying remaining meat come into contact with the groove flanks 12. This occurs under the pressure applied by the compression belt 2 and causes the flowable components, i.e. the remaining meat, to flow into and through the perforations of the hollow drum 1. The meat is then stripped away from the inner contour of the drum 1 by the clearing means 3 and conveyed to the exterior by the screw-wound web 19.

The meat-free bone string together with any non-flowable remains arrive in the region of the stripping means 5 after leaving the compression zone and are stripped from the drum outer surface 7. In doing this, the cylindrical end areas 9 and 10 and the region of the groove 8 are controlled separately by the first and second stripping blades 24, 25, respectively, in order to allow the individual adjustment for each area.

We claim:

1. A method for gaining remaining meat from bone by feeding said bone through a recessed compression zone formed between a perforated supporting surface and an elastic compression element, such that said bone is substantially positioned in said recess; and directing pressure in said compression zone on only portions of said bone that have attached meat to separate the attached meat from the bone and cause the separated meat to flow away from the bone through said perforated supporting surface.

2. A method for gaining remaining meat attached to bone strings of cutlet strings or racks of slaughtered warm-blooded animals by feeding said bone strings through a compression zone having a recess formed between a perforated supporting surface and an elastic compression element, such that said bone strings lie in said recess; and directing pressure on only those portions of said bone strings which carry remaining meat, so as to cause said meat to flow away from said bone wherein the gaining of said remaining meat occurs on feeding and passing said bone string through said compression zone continuously.

3. A separating apparatus for gaining remaining meat from bone strings of cutlet strings or racks of slaughtered warm-blooded animals, in particular pigs, by compressing such bone strings in a compression zone between a perforated supporting surface and an elastic compression element, whereby a quasi hydraulic pressure is exerted only on those parts of said bone string carrying remaining meat in said compression zone, said apparatus comprising:

a) rotatably driven hollow drum means open on one side and having a perforated outer drum surface;

b) compression means arranged along a part of said outer drum surface;

c) endless elastic compression belt means defining an outer belt surface which is wrapped around a portion of the circumference of said hollow drum means and guided such that it forms a draw-in wedge for said material to be compressed and said compression zone in the region of said compression means;

d) clearing means adapted to be located inside said hollow drum means; and e) scraping means associated with said outer drum surface, wherein said hollow drum means comprise groove-like channel means which interrupt said outer drum surface by extending radially and around the same, the cross-section of said channel means corresponding essentially to the cross-section of the bone strings of the cutlet strings to be processed.

4. A separating apparatus for gaining remaining meat from bone strings of cutlet strings or racks of slaughtered warm-blooded animals, in particular pigs, by compressing such bone strings in a compression zone between a perforated supporting surface and an elastic compression element, whereby a quasi hydraulic pressure is exerted only on those parts of said bone string carrying remaining meat in said compression zone and the gaining of said remaining meat occurs on feeding and passing said bone string through said compression zone continuously, said apparatus comprising:

a) rotatably driven hollow drum means open on one side and having a perforated outer drum surface;

b) compression means arranged along a part of said outer drum surface;

c) endless elastic compression belt means defining an outer belt surface which is wrapped around a portion of the circumference of said hollow drum means and guided such that it forms a draw-in wedge for said material to be compressed and said compression zone in the region of said compression means;

d) clearing means adapted to be located inside said hollow drum means; and e) scraping means associated with said outer drum surface, wherein said hollow drum means comprise groove-like channel means which interrupt said outer drum surface by extending radially and around the same, the cross-section of said channel means corresponding essentially to the cross-section of the bone strings of the cutlet strings to be processed.

5. A separating apparatus as claimed in claim 3, wherein said outer drum surface is interspersed with perforations at least in the region of said channel means.

6. A separating apparatus as claimed in claim 4, wherein said outer drum surface is interspersed with perforations at least in the region of said channel means.

7. A separating apparatus as claimed in claim 3, wherein said clearing means is designed in the form of a conveyor worm adapted to be introduced into said hollow drum means through said open side of the same and provided with at least one screw shaped web matching with the contours of the interior of said drum means, said web comprising a leading portion arranged to be pivoted counter to the rotational direction of said drum means within an enveloping circle which has a diameter smaller than the interior diameter of said hollow drum means.

8. A separating apparatus as claimed in claim 4, wherein said clearing means is designed in the form of a conveyor worm adapted to be introduced into said hollow drum means through said open side of the same and provided with at least one screw shaped web matching with the contours of the interior of said drum means, said web comprising a leading portion arranged to be pivoted counter to the rotational direction of said drum means within an enveloping circle which has a diameter smaller than the interior diameter of said hollow drum means.

9. A separating apparatus as claimed in claim 5, wherein said clearing means is designed in the form of a conveyor worm adapted to be introduced into said hollow drum means through said open side of the same and provided with at least one screw shaped web matching with the contours of the interior of said drum means, said web comprising a leading portion arranged to be pivoted counter to the rotational direction of said drum means within an enveloping circle which has a diameter smaller than the interior diameter of said hollow drum means.

10. A separating apparatus as claimed in claim 6, wherein said clearing means is designed in the form of a conveyor worm adapted to be introduced into said hollow drum means through said open side of the same and provided with at least one screw shaped web matching with the contours of the interior of said drum means, said web comprising a leading portion arranged to be pivoted counter to the rotational direction of said drum means within an enveloping circle which has a diameter smaller than the interior diameter of said hollow drum means.

11. A separating apparatus as claimed in claim 3, wherein said guiding means are arranged directly upstream of said draw-in wedge and in alignment therewith as well as with said channel means so as to enable the supplying of the bone string in correct alignment with respect to the position of said channel means.

12. A separating apparatus as claimed in claim 4, wherein said guiding means are arranged directly upstream of said draw-in wedge and in alignment therewith as well as with said channel means so as to enable the supplying of the bone string in correct alignment with respect to the position of said channel means.

13. A separating apparatus as claimed in claim 5, wherein said guiding means are arranged directly upstream of said draw-in wedge and in alignment therewith as well as with said channel means so as to enable the supplying of the bone string in correct alignment with respect to the position of said channel means.

14. A separating apparatus as claimed in claim 6, wherein said guiding means are arranged directly upstream of said draw-in wedge and in alignment therewith as well as with said channel means so as to enable the supplying of the bone string in correct alignment with respect to the position of said channel means.

15. A separating apparatus as claimed in claim 7, wherein said guiding means are arranged directly upstream of said draw-in wedge and in alignment therewith as well as with said channel means so as to enable the supplying of the bone string in correct alignment with respect to the position of said channel means.

16. A separating apparatus as claimed in claim 8, wherein said guiding means are arranged directly upstream of said draw-in wedge and in alignment therewith as well as with said channel means so as to enable the supplying of the bone string in correct alignment with respect to the position of said channel means.

17. A separating apparatus as claimed in claim 9, wherein said guiding means are arranged directly upstream of said draw-in wedge and in alignment therewith as well as with said channel means so as to enable the supplying of the bone string in correct alignment with respect to the position of said channel means.

18. A separating apparatus as claimed in claim 10, wherein said guiding means are arranged directly upstream of said draw-in wedge and in alignment therewith as well as with said channel means so as to enable the supplying of the bone string in correct alignment with respect to the position of said channel means.

* * * * *